Nov. 26, 1935.    J. H. PAYNE    2,022,519
METHOD OF MAKING ELECTRIC HEATING PADS
Original Filed March 6, 1931
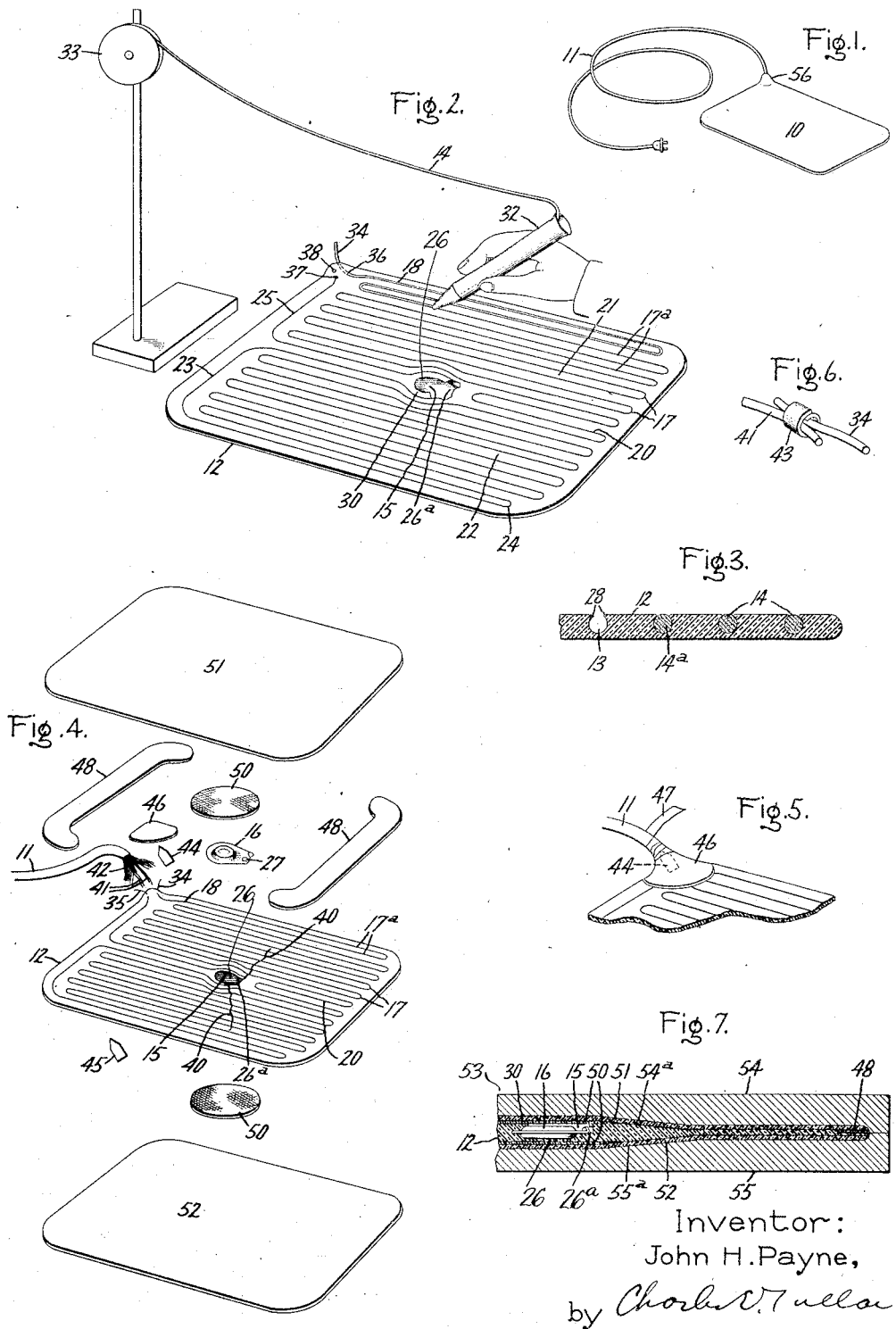
Inventor:
John H. Payne,
by Charles V. Mueller
His Attorney.

Patented Nov. 26, 1935

2,022,519

UNITED STATES PATENT OFFICE 2,022,519

METHOD OF MAKING ELECTRIC HEATING PADS

John H. Payne, Ballston Spa, N. Y., assignor to General Electric Company, a corporation of New York Original application March 6, 1931, Serial No. 520,576. Divided and this application January 26, 1933, Serial No. 653,611

10 Claims. (Cl. 18—59)

My invention relates to electric heaters, more particularly to electric heating pads and the like, and has for its object the provision of an improved method of making an electric heater wherein a suitable heating element and also a controlling thermostat are embedded in a body of flexible, water-proof, air-tight, heat-conducting and electrically-insulating material.

This application is a division of my copending application, Serial No. 520,576, filed March 6, 1931.

In carrying my invention into effect in one form thereof, I form in a body of flexible, waterproof, air-tight, heat-conducting, electrically-insulating and coalescent material, such as rubber, a retaining groove for receiving a resistance conductor, and also a cavity or chamber for receiving a controlling thermostat. This body of material, which preferably will be of sheet form, may be prepared by molding it to the desired shape, the groove and cavity being formed during the molding process; preferably, the groove will be formed into a series of sinuous convolutions distributed substantially uniformly over a comparatively large area of the sheet, and the cavity will be molded so as to be included in a length of the groove. After the sheet has thus been prepared, a suitable heating resistance conductor is threaded or otherwise placed in the groove provided for it in the sheet of rubber, the conductor thereby assuming a sinuous form, the convolutions of the conductor being distributed substantially uniformly over the sheet; then a suitable thermostat is placed in the cavity provided for it in the sheet, the thermostat then being electrically connected with the conductor. After this, a second sheet of rubber is assembled with the first sheet so as to cover the conductor and thermostat, and then is coalesced with this sheet, as by vulcanizing, so that the two sheets are united into one body with the resistance conductor and thermostat embedded therein; if desired, and it is generally preferable to do so, a third sheet of rubber may be arranged so as to cover the side of the first sheet opposite to that side in which the conductor and thermostat have been received, and coalesced with the other sheets during the vulcanizing step. This adds thickness and strength to the finished pad. Preferably before the sheets have been assembled and coalesced suitable reenforcing members will be arranged adjacent the end turns of the convolutions of the conductor and adjacent the thermostat so that they too will be embedded in the unitary body formed by the subsequent coalescing operation.

For a more complete understanding of my invention reference should be had to the accompanying drawing, in which Fig. 1 is a perspective view of an electric heating pad formed in accordance with my invention; Fig. 2 is a perspective view of a sheet of rubber used in making the pad of Fig. 1, in which sheet a suitable groove for receiving a resistance heating element and a suitable cavity or recess for receiving a controlling thermostat for the conductor are provided, and also illustrating one method of inserting the resistance element into its groove; Fig. 3 is an enlarged fragmentary transverse sectional view of the sheet of Fig. 2 and showing the resistance element mounted in its groove; Fig. 4 is an expanded view showing the positions various elements of the electrical heater of Fig. 1 occupy relatively to each other; Fig. 5 is a fragmentary view illustrating the manner in which an electrical supply conductor provided for the heating pad is secured thereto; Fig. 6 is a perspective view of a contact clip used to connect the resistance conductor to the supply conductor; and Fig. 7 is a fragmentary view in section illustrating a method whereby the rubber sheets can be coalesced so as to form a single substantially homogeneous body.

Referring to the drawing, I have shown my invention in one form as applied to the electric heating pad described and claimed in my abovementioned copending application. As shown, the electric heating pad (Fig. 1) comprises a flexible, water-proof, air-tight, heat-conducting and electrically insulating body 10 in which a suitable resistance heating element (not shown in Fig. 1) and a controlling thermostat therefor (also not shown in Fig. 1) are embedded, and a suitable twin supply conductor 11 connected to the heater. The heater preferably will be of flat sheet-like form and the resistance conductor preferably will be formed into a plurality of convolutions distributed over a comparatively large area of the sheet. The thermostat will be included in the circuit of the resistance conductor so as to maintain a substantially constant temperature throughout the heater when the latter is in use. While the sheet 12 may have any suitable shape, I have shown it for the purposes of illustration to be of rectangular form.

In forming the electric heater of Fig. 1 in accordance with my invention, a body 12 (Fig. 2), preferably in sheet form and made of a suitable flexible, water-proof, air-tight, heat conducting, heat resistant and electrically insulating coalescent material, such as rubber containing a suitable anti-oxidant, is provided with a suitable groove 13 in one surface thereof for receiving a resistance heating element 14, and also in the same surface with a suitable cavity or recess 15 for receiving a suitable controlling thermostat 16 (Fig. 4). As shown, the sheet 12 has the same shape as the finished pad (Fig. 1); i. e., it is rectangular in form. This sheet of rubber may be prepared in any suitable way, but preferably will be shaped by molding, the conductor receiving groove 13 and the thermostat cavity 15 being formed during the molding operation.

As shown (Figs. 2 and 4), the groove 13 for receiving the conductor 14 is formed into a series of convolutions 17 comprising a plurality of substantially parallel lengths 17a arranged lengthwise of the rectangular sheet 12 and distributed over a comparatively large area of the sheet; the groove is started at substantially one corner portion of the sheet, the starting point being designated by the numeral 18, and as shown in its parallel convolutions have a length substantially equal to the full length of the sheet and are formed to cover substantially the full width of the sheet. The thermostat cavity or recess 15 is formed in substantially the central portion of the sheet, and the convolution 20, which normally would pass through this central portion throughout substantially the full length of the sheet, is shortened, as shown, so as to extend merely from the cavity to the right hand end of the sheet, as viewed in Fig. 4. In effect, therefore, the convolutions are formed in two series 21 and 22, each series comprising a plurality of convolutions having lengths substantially equal to the full length of the sheet and covering substantially one-half of the width of the sheet, and the two series being connected at the center of the sheet by means of the comparatively short convolution 20. It will be observed that this arrangement of the convolutions provides for the thermostat cavity 15 arranged in the central portion of the sheet. It will also be observed that a length 23 of the groove extends from the last convolution 24 of the series 22 and embraces one end portion, i. e., the left-hand end portion, of this series so as to join the thermostat cavity 15, and from this cavity another length 25 of substantially L-shape bends about the left-hand end portion of the series 21, as shown, so as to extend to the corner of the sheet from which the groove started. It is to be understood that my invention is not limited to the specific arrangement of convolutions shown, but that other suitable arrangements can be used, it being desirable, however, that the convolutions cover a substantial area of the sheet. Furthermore, it is not necessary that the groove start and end at one corner of the sheet as shown. The ends of the grooves may be brought out at any suitable portion of the sheet; thus, for example, these ends may be located at the central portion of one end of the sheet.

As shown, the thermostat cavity 15 is provided with a substantially circular portion 26 (Figs. 2, 4 and 7) for receiving the body of the thermostat 16 and a second portion 26a extending therefrom for accommodating binding posts 27 of the thermostat. The several lengths of the convolutions on each side of and adjacent the cavity 15 are curved to correspond with the shape of the cavity.

Preferably the groove 13 will be under-cut so that overhanging portions 28 (Fig. 3) will be provided at the mouth of the groove whereby when the electrical resistance element 14 is positioned therein, as shown in Fig. 3, the overhanging portions will serve to secure the element; likewise, the cavity 15 will have an under-cut portion arranged about the circular chamber portion 26 so as to define an overhanging portion 30 which when the thermostat is assembled with the sheet will serve to secure the thermostat. Preferably, the central portion of the sheet in which the thermostat cavity 15 is located will be made thicker than the remaining portions of the sheet, as shown in Fig. 7, so that the cavity may have a depth sufficient to accommodate the thermostat without materially weakening the portion of the pad where the thermostat is located.

It is believed to be unnecessary to illustrate the pattern used in molding the rubber sheet shown in Fig. 1, and that it is sufficient to state that the pattern will be arranged so as to provide a sheet of rubber of the form shown in Fig. 1 with the under-cut grooves and cavity provided therein.

After the sheet 12 has thus been formed with its conductor retaining groove 13 and thermostat cavity 15, the electrical resistance heating element 14 is inserted in the groove 13 so as to extend throughout the entire length of the groove. Preferably, the element should be covered with a suitable adhesive that will harden quickly, such as rubber cement, before it is placed in the groove, so that when it is placed or inserted therein the cement together with the overhanging portions of the groove will effectively secure the element in the sheet. The element 14 may readily be inserted in the groove by means of a suitable pencil 32 (Fig. 2) through which the element is passed and in which the adhesive is placed. It will be observed by reason of this arrangement that as the element is fed from a suitable supply source, as for example a spool 33, and is passed through the pencil, the entire outer surface of the element will be covered with the adhesive. It will also be observed that if the pencil point be placed in the initial portion of the groove and if the end portion 34 of the element be held temporarily in some suitable fashion, as by the fingers, and then if the pencil point be drawn through the groove by some suitable means, as by the fingers, the element will be inserted or threaded in the groove. In this manner the element may readily be inserted throughout the full length of the groove and will be deposited or laid beneath the overhanging portions 28 of the groove, these portions being sufficiently yielding to allow the pencil point to be drawn along the length of the groove so as to deposit the element beneath them. It will be understood that these overhanging portions and the adhesive which will have been previously applied to the element will effectively secure the element in the groove.

Preferably, the end portions 34 and 35 (Fig. 4) of the heating element will be brought out on opposite sides of the sheet 12. To effect this, the end portion 34 will be passed through a suitable hole 36 provided for it in the sheet, while the end portion 35 will be threaded through a pair of holes 37 and 38 so that it is passed first from the groove on the upper side of the sheet through the hole 37 to the under side of the sheet and thence is directed from the under side of the sheet through the second hole 38 back to the upper side of the sheet. This arrangement separates the ends of the element and also tends to secure them to the sheet.

While any suitable heating element 14 may be used, I prefer to use a resistance conductor having a comparatively low specific resistance and one which will not be attacked by rubber. For this purpose, a conductor formed of nickel may be used. The heating element may be formed by winding the nickel resistance conductor in the form of a helix on a flexible cord-like supporting member 14a. Preferably, a non-extensible cord, such as cotton cord, will be used.

After the heating element has been laid in the groove and its end portions secured, the thermostat 16 will be inserted in its cavity 15, the overhanging portions 30 of the cavity serving to secure the thermostat. Preferably, the resistance conductor will have been threaded in the groove so that a loop or bight of the conductor will be formed about the cavity 15; after the conductor has been laid, this loop will be severed so as to form two relatively long lengths 40 (Fig. 4), which lengths afterwards will be connected with the binding posts 27 of the thermostat so as to include the thermostat in series with the conductor. After the thermostat has been inserted in its receptacle the lengths 40 of the conductor will be secured to the binding posts 27. The binding posts, as shown, are turned upon themselves so that the lengths 40 can be pinched between the return-bend and the body of the posts. Preferably, the surfaces of the posts in contact with the lengths 40 will be covered with a suitable soft metal, such as solder or tin, so that when the lengths are pinched the nickel resistance element will be pressed into the soft metal coating by the resiliency of the supporting cotton body 14a. This insures a good electrical contact between the resistance conductor and the thermostat.

After the conductor and thermostat have thus been assembled with the sheet 12 and have been connected in circuit with each other, the twin supply conductor will be electrically connected with the resistance conductor 14 and will be secured to the sheet 12. As shown (Fig. 4) the insulation of the outer casing of the supply conductor, which insulation preferably will be formed of vulcanized rubber, will be cut away somewhat so as to bare the end portions 41 of the supply conductors and so as to free the end portion 42 of the insulating fibrous filling or rope surrounding the conductors. The bared portions of the supply conductors are secured to the respective end portions 34 and 35 of the resistance conductor 14 by means of suitable clamping members 43, which as shown (Fig. 6) are cylindrical members broken so as to have overlapping edges whereby the members can be clamped or squeezed about the conductors to secure them. Preferably, the inner surfaces of the clamping members will be lined with a soft metal, such as solder or tin, so that when the members are clamped about the conductor the nickel resistance element of the heating element 14 will be pressed by its cotton supporting body into the soft metal linings; this insures a good electrical contact between the element 14 and the clamping members. After the supply conductors have thus been secured to the resistance conductor 14, a portion—approximately one-half—of the insulating fibre 42 of the supply conductor is secured to the upper side of the rubber sheet 12 by means of a suitable tab 44, while the remaining portion of the insulating fibre is secured to the under side of the insulating sheet by means of a similar tab 45. These tabs preferably will be formed of fabric rubber and will be arranged with their fabric sides adjacent the rubber sheet 12. The tabs will be secured to the sheet by means of a suitable adhesive, such as rubber cement.

After the tabs 44 and 45 have thus been applied to secure the insulating fabric, a suitable reenforcing member 46 having a substantially triangular shape is arranged in the corner of the sheet 12 where the supply conductor 11 is connected so that the right angle of the member as shown (Figs. 4 and 5) coincides with the angular corner of the sheet. This member is placed over the upper tab 44, and is secured to the sheet 12 in any suitable manner, as by means of a suitable adhesive, which may be rubber cement. Then a suitable tape 47 (Fig. 5) is wrapped around the connected end portion of the supply conductor 11 adjacent the sheet 12. Both the reenforcing member 46 and the tape 47 will be formed of unvulcanized rubber so that during the subsequent vulcanizing operation, referred to in a previous portion of this specification, these members will flow about and effectively seal the connected end of the supply conductor 11.

In order to prevent displacement of the end turns of the conductor and in order to strengthen the heating pad at these portions, suitable reenforcing strips 48 formed from some suitable mechanically strong material and one which is not thermally plastic, such as vulcanized rubber, are placed over the end turns of the convolutions. While individual or separate reenforcing strips may be placed over each end turn, I prefer to form the reenforcing strips so that they will have a length sufficient to cover all of the end turns at one end of the sheet 12. As shown in Fig. 4, these strips have a length substantially equal to the width of the sheet 12, and, moreover, the end portions of these strips are curved inwardly so as to cover the end turns of the first and last convolutions formed in the pad. These reenforcing strips preferably will be secured to the pad by means of a suitable adhesive, such as rubber cement.

Likewise, suitable reenforcing members 50, shown as of disc form, are secured to the opposite sides of the sheet 12 over the thermostat 16. These discs preferably will be formed of fabric rubber, the fabric side being placed adjacent the sheet; and will be secured to the sheet in any suitable manner, as by means of an adhesive, which, as before, may be rubber cement.

After the reenforcing members 46, 48, and 50 have been applied to the sheet 12, suitable sheets of coalescent rubber 51 and 52 having areas substantially equal to the area of the sheet 12 are placed on the opposite surfaces of the sheet so as to substantially cover the areas of these surfaces.

The sheets 12, 51 and 52 are then coalesced so as to form a single flexible body in which the resistance conductor, thermostat and the reenforcing members are embedded. This operation may be effected by vulcanizing the sheets. To effect this vulcanizing operation, the assembled sheets may be placed in a suitable pressure device 53 (Fig. 7) for applying a suitable pressure to the members during the vulcanizing heating step. This pressure device comprising two plate members 54 and 55 provided with recesses 54a and 55a which when the members are placed together define a chamber having the same shape that the finished pad is to have, including a portion arranged to define the teatlike projection 56 (Fig. 1) embracing the connected end portion of the supply conductor and which portion, as has been pointed out, will be formed by the vulcanizing of the members 46 and 47 during the vulcanizing step. By means of this vulcanizing process the sheets 12, 51, and 52 and also the members 46 and 47 are coalesced into a single homogeneous body.

The reenforcing members 47 effectively prevent displacement of the end turn of the resistance element during the vulcanizing step. It will be understood that during this step the rubber tends to expand somewhat when the temperature is raised, whereas the cotton cord on which the resistance conductor is wound is practically non-extensible; as a result of this tendency it is possible that the end turns of the element would be pulled from the groove 13 if the members 48 were omitted.

The members 48 and the groove 13 also overcome any tendency of the conductor to become displaced by any flowing action of the rubber sheet 12 during the vulcanizing operation. As is well understood by those skilled in the art, it is possible that the rubber will tend to flow somewhat during the vulcanizing step because of the difference in thickness of the central portion and the remaining portions of the sheet 12; if the groove 13 and members 48 were omitted it is quite likely that some of the turns and lengths of the heating element would become displaced by reason of this tendency of the rubber to flow.

The resulting heating pad is practically a single sheet of flexible rubber with a resistance heating conductor and a controlling thermostat embedded therein, and also reenforcing members positioned at those portions of the pad where if they were omitted it is possible that the pad would be weakened. The resistance conductor is firmly anchored in place so that it is impossible for any of its turns to become separated from each other or displaced.

Moreover, the rubber forms a water-proof and air-tight casing around the resistance conductor, thermostat and reenforcing members; also a substantially water and air-tight seal is arranged about the connected end portion of the supply conductor 11.

The non-extensible cord 14a on which the resistance conductor is wound prevents lengthwise stretching of the pad; this protects the heating element and also strengthens the pad.

Furthermore, by reason of the fact that the rubber body of the pad is a good conductor of heat, it is not likely that the portions of the body adjacent the resistance conductor will deteriorate.

It will be understood in view of the fact that the thermostat 16 is subjected to considerable pressure during the vulcanizing process it must have considerable mechanical strength, and so it is preferable to use a thermostat having a comparatively great mechanical strength. Preferably, a thermostat will be used of the type described and claimed in my above-mentioned copending application.

While I have shown a particular embodiment of my invention, it will be understood, of course, that I do not wish to be limited thereto, since modifications may be made, and I therefore contemplate by the appended claims to cover any such modifications as fall within the true spirit and scope of my invention.

What I claim as new and desire to secure by Letters Patent of the United States is:

1. The method of making an electric heater which comprises forming a sheet-like rubber supporting member with a continuous groove therein, inserting a resistance conductor in said groove, placing on said supporting member a second sheet-like rubber member so as to cover said groove, covering electrical supply conductors with a coating of flexible rubber, connecting said supply conductors with said resistance conductor and then joining said rubber members and said covering on said supply conductors into a substantially homogeneous unitary body.

2. The method of making an electric heater which comprises securing a resistance conductor to a flexible rubber body in fixed relation with said body, covering said resistance conductor with a second flexible rubber body similar to said first body covering electrical supply conductors with a coating of flexible rubber and then coalescing said bodies and said rubber coating so as to form a continuous unitary flexible rubber body covering said resistance conductor and said supply conductors.

3. The method of making an electric heater which comprises forming a substantially flat coalescent body with a continuous groove in one surface thereof distributed throughout a substantial area of said surface, inserting in said groove a resistance conductor, assembling on the opposite sides of said coalescent body similar bodies covering substantially the entire areas of said opposite sides, covering electrical supply conductors with a coalescent body, connecting the conducting members of said conductors with said resistance conductor, then coalescing said bodies and said covering on said supply conductors so as to unite them into one body.

4. The method of making an electric heater which comprises covering an electrical conductor with an adhesive, forming in a flexible coalescent body an under-cut groove arranged to receive said electrical conductor and cooperating with said adhesive to secure said conductor when placed within said groove, inserting said electrical conductor with the adhesive thereon in said groove, placing over said body a second coalescent body so as to cover said groove and then coalescing said bodies into one body so that said resistance conductor is embedded in the body thus formed.

5. The method of making an electric heating pad which comprises forming in a sheet of flexible rubber a groove formed into a plurality of convolutions extending over a substantial area of said sheet, inserting in said groove a resistance conductor, placing over the end turns of said groove reenforcing members, assembling with said sheet a second sheet of flexible rubber so as to cover said resistance conductor and said reenforcing members and then coalescing said sheets of rubber so as to form a flexible, water-proof, homogeneous body with said resistance conductor and said reenforcing members embedded therein.

6. The method of making an electric heating pad which comprises forming in one surface of a sheet of flexible rubber a continuous under-cut groove extending throughout a substantial portion of the area of said sheet, forming in said sheet an under-cut cavity so that said cavity is included in the length of said groove, threading in said groove a resistance conductor so that said conductor is secured by the over-hanging portions of said groove, inserting in said cavity a thermostat so that said thermostat is secured by the over-hanging portions of said cavity and then connecting said thermostat with said resistance conductor, then covering said one surface with a sheet of flexible rubber and then vulcanizing said sheets of flexible rubber so as to form a substantially homogeneous, flexible pad with said resistance conductor and thermostat embedded therein.

7. The method of making an electric heating pad which comprises molding a sheet of flexible rubber with an under-cut groove therein formed into a plurality of convolutions, covering a resistance conductor with an adhesive and then threading said resistance conductor in said groove so that the overhanging portions of said groove and said adhesive serve to secure said conductor in said groove, placing over said groove a sheet of flexible rubber and then vulcanizing said sheets of rubber so as to form a substantially homogeneous flexible pad with said resistance conductor embedded therein.

8. The method of making an electric heater which comprises forming in one surface of a sheet of flexible rubber a continuous groove extending throughout a substantial portion of the area of said sheet, forming a cavity in said sheet so that said cavity is included in the length of said groove, threading in said groove a resistance conductor, inserting in said cavity a thermostat and then connecting said thermostat in circuit with said conductor, placing over the end turns of said groove reenforcing members and placing over said thermostat a reenforcing member, then placing over said groove and reenforcing members a flexible rubber sheet and then coalescing said sheets of rubber so as to form a substantially homogeneous flexible pad with said resistance conductor, thermostat and reenforcing members embedded therein.

9. The method of making an electric heating pad which comprises forming in one surface of a sheet of flexible rubber an under-cut groove having a plurality of convolutions covering a substantial area of said sheet, forming in said sheet an under-cut cavity in series with said groove, inserting in said groove a resistance conductor so that the overhanging portions of the groove secure said conductor in said groove, inserting in said cavity a thermostat so that the overhanging portions of said cavity secure said thermostat in said cavity, connecting said thermostat electrically with said conductor, securing reenforcing members over the end turns of said resistance conductor and on opposite sides of said thermostat, placing on the opposite sides of said sheet of rubber similar sheets of rubber covering substantially the entire areas of said opposite sides, and then vulcanizing said three sheets to form a substantially homogeneous flexible rubber body in which said resistance conductor, thermostat and reenforcing members are embedded.

10. The method of making an electric heating pad which comprises forming in one surface of a sheet of flexible rubber a groove having a series of convolutions, the extreme end portions of said groove being arranged adjacent each other, threading in said groove a resistance conductor, the extreme ends of said resistance conductor being brought to the adjacent end portions of said groove, securing to said end portions the conductors of a supply conductor, securing a reenforcing member to said sheet at the portion where said conductors are secured, placing on opposite sides of said sheet of rubber similar sheets of rubber covering substantially the entire areas of said opposite sides and then vulcanizing said sheets of rubber so as to form a substantially homogeneous flexible body with said resistance conductor and said reenforcing members embedded in it.

JOHN H. PAYNE.